(12) United States Patent
Gusev et al.

(10) Patent No.: US 10,445,379 B2
(45) Date of Patent: Oct. 15, 2019

(54) METHOD OF GENERATING A TRAINING OBJECT FOR TRAINING A MACHINE LEARNING ALGORITHM

(71) Applicant: YANDEX EUROPE AG, Lucerne (CH)

(72) Inventors: Gleb Gennadievich Gusev, Moscow (RU); Valentina Pavlovna Fedorova, Sergiev Posad (RU); Andrey Sergeevich Mishchenko, Troitsk (RU)

(73) Assignee: YANDEX EUROPE AG, Lucerne (CH)

( * ) Notice: Subject to any disclaimer, the term of this patent is extended or adjusted under 35 U.S.C. 154(b) by 172 days.

(21) Appl. No.: 15/607,603

(22) Filed: May 29, 2017

(65) Prior Publication Data

US 2017/0364810 A1 Dec. 21, 2017

(30) Foreign Application Priority Data

Jun. 20, 2016 (RU) ................................ 2016124338

(51) Int. Cl.
*G06F 16/30* (2019.01)
*G06F 16/951* (2019.01)
(Continued)

(52) U.S. Cl.
CPC ............ *G06F 16/951* (2019.01); *G06F 17/18* (2013.01); *G06N 7/005* (2013.01); *G06N 20/00* (2019.01)

(58) Field of Classification Search
CPC ....... G06F 16/951; G06F 17/18; G06N 20/00; G06N 7/005
See application file for complete search history.

(56) References Cited

U.S. PATENT DOCUMENTS 8,032,473 B2 10/2011 Rice et al.
8,639,446 B1 1/2014 Stupp
(Continued)

FOREIGN PATENT DOCUMENTS

WO 2014/210334 A1 12/2014

OTHER PUBLICATIONS

Tibshirani et al., "Robust Logistic Regression using Shift Parameters", Stanford University, 2014, pp. 1-25.
(Continued)

*Primary Examiner* — Tarek Chbouki
(74) *Attorney, Agent, or Firm* — BCF LLP (57) ABSTRACT

There is disclosed a computer implemented method of generating a training object for training a machine learning algorithm (MLA). The method comprises: acquiring a digital training document to be used in the training; transmitting the digital training document to a plurality of assessors, transmitting further including indicating a range of possible labels for the assessors to assess from, the range of possible labels including at least a first possible label and a second possible label; obtaining from each of the plurality of assessors a selected label to form a pool of selected labels; generating a consensus label distribution based on the pool of selected labels, the consensus label distribution representing a range of perceived labels for the digital training document and an associated probability score for each of the perceived labels; and training the machine learning algorithm using the digital training document and the consensus label distribution.

17 Claims, 5 Drawing Sheets

(51) Int. Cl.
*G06F 17/18* (2006.01)
*G06N 20/00* (2019.01)
*G06N 7/00* (2006.01)

(56) References Cited

U.S. PATENT DOCUMENTS

| | | |
|---|---|---|
| 8,885,928 B2 | 11/2014 | Forman |
| 8,914,321 B2 | 12/2014 | Zhou et al. |
| 9,141,966 B2 | 9/2015 | Merugu et al. |
| 9,235,808 B2 | 1/2016 | Bilal et al. |
| 2003/0023385 A1 | 1/2003 | Lazaridis et al. |
| 2008/0097936 A1* | 4/2008 | Schmidtler ............ G06N 20/00 706/12 |
| 2009/0171933 A1* | 7/2009 | Schachter ............ G06F 16/954 |
| 2010/0153318 A1 | 6/2010 | Branavan et al. |
| 2010/0312725 A1* | 12/2010 | Privault ................ G06N 5/043 706/12 |
| 2012/0265573 A1 | 10/2012 | Van et al. |
| 2012/0278266 A1* | 11/2012 | Naslund ................ G06N 20/00 706/45 |
| 2012/0290293 A1 | 11/2012 | Hakkani-Tur et al. |
| 2013/0254126 A1* | 9/2013 | Koenig .................. G06Q 10/00 705/311 |
| 2014/0201126 A1* | 7/2014 | Zadeh .................... G06N 7/005 706/52 |
| 2016/0063993 A1* | 3/2016 | Dolan .................... G06F 16/00 704/254 |
| 2016/0117600 A1 | 4/2016 | Rice |
| 2016/0162458 A1* | 6/2016 | Munro ................... G06F 16/35 715/230 |

OTHER PUBLICATIONS

Halpern et al., "Anchored Discrete Factor Analysis", New York University, Beth Israel Deaconess Medical Center, 2015, pp. 1-25.

Hosseini et al., "On Aggregating Labels from Multiple Crowd Workers to Infer Relevance of Documents", R. Baeza-Yates et al. (EDS.): ECIR 2012, LINCS 7224, pp. 182-194.

Guo, "Expected Classification Accuracy using the Latent Distribution", Practical Assessment, Research & Evaluation, 2006, vol. 11, No. 6, pp. 1-9.

Pastemack et al., "Latent Credibility Analysis", World Wide Web Conference Committee, 2013.

\* cited by examiner

METHOD OF GENERATING A TRAINING OBJECT FOR TRAINING A MACHINE LEARNING ALGORITHM

CROSS-REFERENCE

The present application claims priority to Russian Patent Application No. 2016124338, filed Jun. 20, 2016, entitled "Method Of Generating A Training Object For Training A Machine Learning Algorithm," the entirety of which is incorporated herein.

TECHNICAL FIELD

The present technology relates to methods and systems for generating a training object for training a machine learning algorithm.

BACKGROUND

With ever increasing amount of data stored at various servers, the task of efficient searching becomes an ever-more important one. Taking an example of the Internet, there are millions and millions of resources available on the Internet and several search engines (such as, GOOGLE™, YAHOO!™, YANDEX™, BAIDU™ and the like) that aim to provide users with a convenient tool for finding relevant information that is responsive to the user's search intent.

A typical search engine server executes a crawling function. More specifically, the search engine executes a robot that "visits" various resources available on the Internet and indexes their content. Specific algorithms and schedules for the crawling robots vary, but on the high level, the main goal of the crawling operation is to (i) identify a particular resource on the Internet, (ii) identify key themes associated with the particular resource (themes being represented by key words and the like), and (iii) index the key themes to the particular resource.

Once a search query from a user is received by the search engine, the search engine identifies all the crawled resources that are potentially related to the user's search query. The search engine then executes a search ranker to rank the so-identified potentially relevant resources. The key goal of the search ranker is to organize the identified search results by placing potentially most relevant search results at the top of the search engine results list. Search rankers are implemented in different manners, some employing Machine Learning Algorithms (MLAs) for ranking search results.

A typical MLA used by the search rankers is trained using training datasets. Normally, the training dataset comprises a given document (such as a web resource) potentially relevant (or responsive) to a training search query.

Crowdsourcing platforms, such as the Amazon Mechanical Turk™, make it possible to label large datasets in a shorter time and at a lower cost comparing to that needed by professional assessors. However, as assessors on crowdsourcing platforms are generally non-professional and vary in levels of expertise, the obtained label can be "noisy"—in the sense that the labels assigned to a given object by different assessors can be markedly different. For example, some assessors tend to be very conservative (i.e. assign good scores to only very relevant objects), while other assessors can be more lenient in their selection of label.

A conventional manner to get consensus labels is to compute the majority vote among noisy labels for each object. However, this solution ignores any difference between workers, which may lead to poor results when low qualified assessors are dominant in the task.

Another conventional setting is based on the latent label assumption, implying that all assessors perceive the same value of the latent true label, and then this value is corrupted by the assessors with regard to a chosen labelling model. As a consequence, labelling models designed under this assumption treat any disagreements among noisy labels for an object as mistakes made by workers.

Common approaches to noise reduction include cleansing and weighting techniques. Briefly speaking, noise cleansing techniques are similar to "outlier detection" and amount to filtering out selected labels which "look like" mislabeled for some reasons. With the weighting approach, none of the selected labels are completely discarded, while their impact on a machine learning algorithm is controlled by weights, representing the confidence in a particular label. The noise cleansing techniques and the weighting approach are both premised on the assumption that a "single true label" exists for each digital training document.

SUMMARY

It is an object of the present technology to ameliorate at least some of the inconvenience present in the prior art.

Embodiments of the present technology have been developed based on developers' appreciation of at least one technical problem associated with the prior art solutions.

Without wishing to be bound by any specific theory, developers of the present technology believe that the traditional approaches to consensus label generation fail to explain a certain kind of disagreements among labels produced by assessors which is typical for some types of objects. For example it is well known that, when assessing relevance of documents to search queries, even well trained experts may disagree about the true label (i.e. true relevance of the given document to the search query) for certain documents. Indeed, to properly associate a label to a document with respect to the search query, one has to appreciate many aspects of the object such as the relevance, novelty, coverage, brand, design, etc. Facing such complex task, even the expert assessor may have personal preferences on the value of different aspects, which results in different selection of labels. Developers believe that this is equivalent to saying that a single true label of an object does not exist, but rather each object has its specific distribution over possible true perceived labels. Similar problems, albeit in a somewhat exacerbated form, are believed to be present in crowd-souring based system for labelling documents.

Hence, developers of the present technology address the above-discussed drawbacks associated with the traditional approaches to generating consensus labels by developing a document labelling setting where it is assumed that no single true label exist for the object, but rather that each object may have multiple different "subjective but true" perceived labels. As such, embodiments of the present technology are aimed at generating a consensus label distribution in a form of a distribution of perceived labels. The consensus label distribution may also include a probability score associated with each of the perceived labels.

In accordance with a first broad aspect of the present technology, there is provided a computer implemented method generating a training object for training a machine learning algorithm, the training object including a digital training document and an assigned label. The method is executable at a training server. The method comprises: acquiring the digital training document to be used in the training; transmitting, via a communication network, the digital training document to a plurality of assessors, transmitting further including indicating a range of possible labels for the assessors to assess from, the range of possible labels including at least a first possible label and a second possible label; obtaining from each of the plurality of assessors a selected label to form a pool of selected labels; generating a consensus label distribution based on the pool of selected labels, the consensus label distribution representing a range of perceived labels for the digital training document and an associated probability score for each of the perceived labels; and training the machine learning algorithm using the digital training document and the consensus label distribution.

In some implementations of the method, the method further comprises determining an expertise parameter for each of the plurality of assessors based on the pool of selected labels; and determining a difficulty parameter of the digital training document based on the pool of selected labels.

In some implementations of the method, the expertise parameter is independent of the digital training document assessed; and the difficulty parameter is independent of any assessor assessing the digital training document.

In some implementations of the method, the consensus label distribution is determined by determining an assessor-specific perceived label distribution for each assessor of the plurality of assessors; aggregating each of the assessor-specific perceived label distribution of the plurality of assessors.

In some implementations of the method, the assessor-specific perceived label distribution for a given assessor is determined as follow. For the first possible label: determining an assessor-inherent probability score of the first possible label being selected by the given assessor; determining a conditional probability score based at least on the expertise parameter and the difficulty parameter, the conditional probability score representing the probability of the selected label provided the given assessor perceived the first possible label as a most relevant label to the digital training document; and aggregating the assessor-inherent probability score and the conditional probability score to obtain a first label specific perceived score. For the second label: determining the assessor-inherent probability score of the second possible label being selected by the given assessor; determining the conditional probability score based at least on the expertise parameter and the difficulty parameter, the conditional probability score representing the probability of the selected label provided the given assessor perceived the second possible label as the most relevant label to the digital training document; aggregating the assessor-inherent probability score and the conditional probability score to obtain a second label specific perceived score. Then, aggregating the first label specific perceived score and the second label specific perceived score.

In some implementations of the method, the assessor-inherent probability score is determined based at least on a given assessor's assessor-specific tendency parameter.

In some implementations of the method, the method further comprises determining the given assessor's assessor-specific tendency parameter based at least from the given assessor's assessing history.

In some implementations of the method, the consensus label distribution is derived by maximizing likelihood of the selected label by using a formula:

$$L(\{y_j^w\}) = \prod_{w \in W_j} \sum_{z_j^w \in Y} Pr(z_j^w) Pr(y_j^w \mid Z_j = z_j^w).$$

In some implementations of the method, the formula is calculated using at least one modified model based on (i) a Dawid and Skene model, (ii) a GLAD model, and (iii) a minimax entropy principle.

In some implementations of the method, the plurality of assessors comprises a first assessor and a second assessor, and wherein the selected label obtained from the first assessor is different from the selected label obtained from the second assessor.

In some implementations of the method, the machine learning algorithm is executed by a ranking application of a search ranker server, and wherein the training is based on a target of improving the accuracy of the machine learning algorithm.

In some implementations of the method, improving the accuracy represents improving a relevancy of a search result in response to a search request.

In some implementations of the method, the training server is the search ranker server.

In accordance with another broad aspect of the present technology, there is provided a training server for training a ranking application, the ranking application for ranking search results. The training server comprises a network interface for communicatively coupling to a communication network and a processor coupled to the network interface. The processor is configured to: acquire the digital training document to be used in the training; transmit, via the communication network, the digital training document to a plurality of assessors, transmitting further including indicating a range of possible labels for the assessors to assess from, the range of possible labels including at least a first possible label and a second possible label; obtain from each of the plurality of assessors a selected label to form a pool of selected labels; generate a consensus label distribution based on the pool of selected labels, the consensus label distribution representing a range of perceived labels for the digital training document and an associated probability score for each of the perceived labels; and train the machine learning algorithm using the digital training document and the consensus label distribution.

In some embodiments of the training server, the processor is further configured to determine an expertise parameter for each of the plurality of assessors based on the pool of selected labels; and determine a difficulty parameter or the digital training document based on the pool of selected labels.

In some embodiments of the training server, the expertise parameter is independent of the digital training document assessed; and the difficulty parameter is independent of any assessor assessing the digital training document.

In some embodiments of the training server, the consensus label distribution is determined by the processor that is configured to determine an assessor-specific perceived label distribution for each assessor of the plurality of assessors; and aggregate each of the assessor-specific perceived label distribution of the plurality of assessors.

In some embodiments of the training server, the assessor-specific perceived label distribution for a given assessor is determined by the processor. The processor is configured to, for the first possible label: determining an assessor-inherent probability score of the first possible label being selected by the given assessor; determining a conditional probability score based at least on the expertise parameter and the difficulty parameter, the conditional probability score representing the probability of the selected label provided the given assessor perceived the first possible label as a most relevant label to the digital training document; and aggregating the assessor-inherent probability score and the conditional probability score to obtain a first label specific perceived score. The processor is also configured to, for the second possible label: determining the assessor-inherent probability score of the second possible label being selected by the given assessor; determining the conditional probability score based at least on the expertise parameter and the difficulty parameter, the conditional probability score representing the probability of the selected label provided the given assessor perceived the second possible label as the most relevant label to the digital training document; aggregating the assessor-inherent probability score and the conditional probability score to obtain a second label specific perceived score. The processor is further configured to aggregate the first label specific perceived score and the second label specific perceived score.

In some embodiments of the training server, the assessor-inherent probability score is determined based at least on the given assessor's assessor-specific tendency parameter.

In some embodiments of the training server, the processor further configured to determine the given assessor's assessor-specific tendency parameter based at least from the given assessor's assessing history.

In some embodiments of the training server, the plurality of assessor comprises a first assessor and a second assessor, and wherein the selected label obtained from the first assessor is different from the selected label obtained from the second assessor.

In some embodiments of the training server, the machine learning algorithm is executed by a ranking application of a search ranker server, and wherein the training is based on a target of improving the accuracy of the machine learning algorithm.

In some embodiments of the training server, improving the accuracy represents improving a relevancy of a search result in response to a search request.

In some embodiments of the training server, the training server is the search ranker server.

In the context of the present specification, unless expressly provided otherwise, an "electronic device", a "user device", a "server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "storage" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
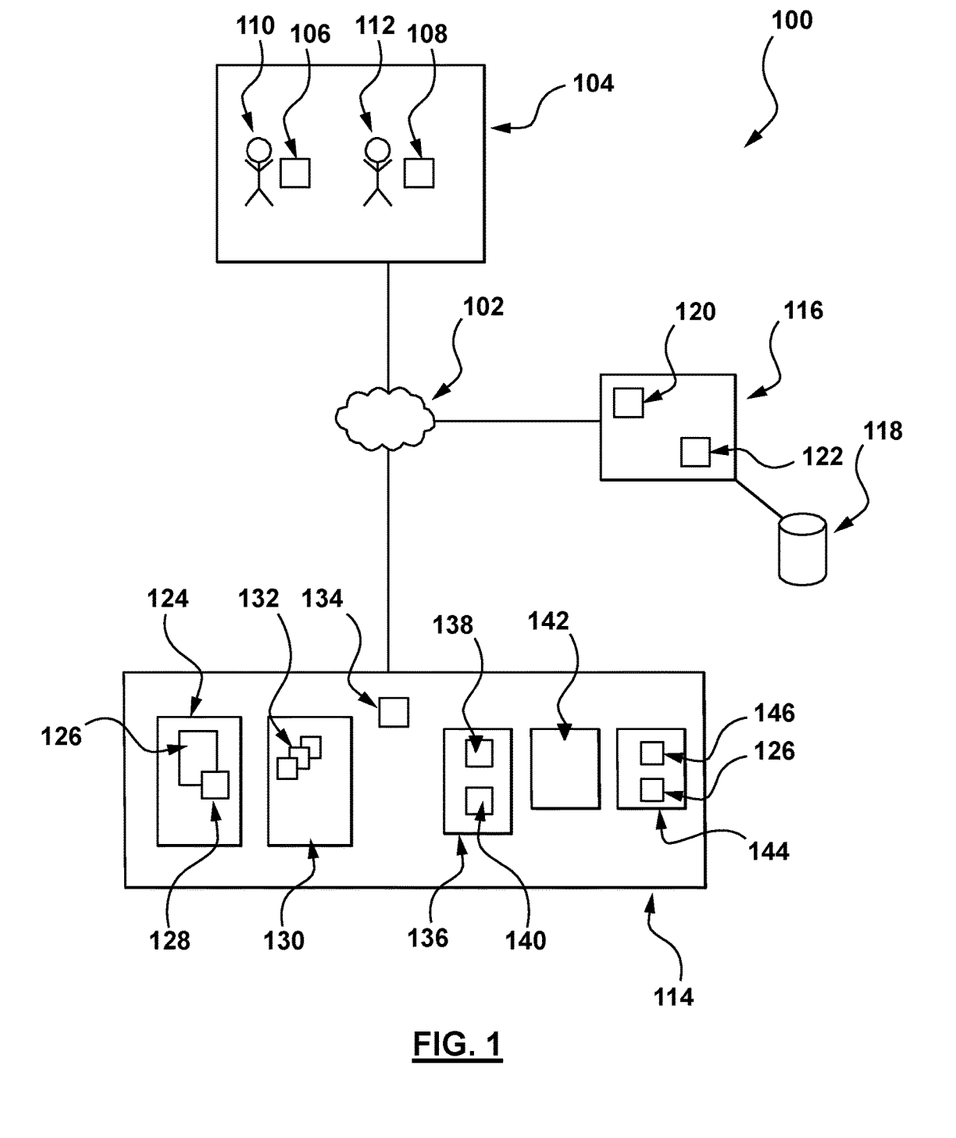
FIG. 1 depicts a system suitable for implementing non-limiting embodiments of the present technology.

With reference to FIG. 1, there is depicted a system 100, the system implemented according to embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a communication network 102 for providing communication between various components of the system 100 communicatively coupled thereto. In some non-limiting embodiments of the present technology, the communication network 102 can be implemented as the Internet. In other embodiments of the present technology, the communication network 102 can be implemented differently, such as any wide-area communication network, local-area communication network, a private communication network and the like. The communication network 102 can support exchange of messages and data in an open format or in an encrypted form, using various known encryption standards.

The system 100 comprises a plurality of electronic devices 104, the plurality of electronic devices 104 being communicatively coupled to the communication network 102. In the depicted embodiments, the plurality of electronic devices 104 comprises a first electronic device 106 and a second electronic device 108. It should be noted that the exact number of the plurality of the electronic devices 104 is not particularly limited, and generally speaking, it can be said that the plurality of electronic devices 104 comprises at least two electronic devices such as those depicted.

The first electronic device 106 is associated with a first assessor 110 and, as such, can sometimes be referred to as "first client device". It should be noted that the fact that the first electronic device 106 is associated with the first assessor 110 does not need to suggest or imply any mode of operation—such as a need to log in, a need to be registered or the like. The implementation of the first electronic device 106 is not particularly limited, but as an example, the first electronic device 106 may be implemented as a personal computer (desktops, laptops, netbooks, etc.), a wireless communication device (a cell phone, a smartphone, a tablet and the like), as well as a network equipment (a router, a switch, or a gateway).

The second electronic device 108 is associated with a second assessor 112 and, as such, can sometimes be referred to as a "second client device". It should be noted that the fact that the second electronic device 108 is associated with the second assessor 112 does not need to suggest or imply any mode of operation—such as a need to log in, a need to be registered or the like. The implementation of the second electronic device 108 is not particularly limited, but as an example, the second electronic device 108 may be implemented as a personal computer (desktops, laptops, netbooks, etc.), a wireless communication device (a cell phone, a smartphone, a tablet and the like), as well as a network equipment (a router, a switch, or a gateway).

Also coupled to the communication network 102 are a training server 114 and a search ranker server 116. Even though in the depicted embodiment the training server 114 and the search ranker server 116 are depicted as separate entities, functionality thereof can be executed by a single server.

The manner in which the training server 114 and the search ranker server 116 are implemented is not limited. For example, both the training server 114 and the search ranker server 116 can be implemented as a Dell™ PowerEdge™ Server running the Microsoft™ Windows Server™ operating system. Needless to say, the training server 114 and the search ranker server 116 can be implemented in any other suitable hardware and/or software and/or firmware or a combination thereof. In the depicted non-limiting embodiment of present technology, each of the training server 114 and the search ranker server 116 is a single server. In alternative non-limiting embodiments of the present technology, the functionality of the training server 114 and the search ranker server 116 may be distributed and may be implemented via multiple servers.

Even though the training server 114 and the search ranker server 116 have been described using an example of the same hardware, they do not need to be implemented in the same manner therebetween.

In some embodiments of the present technology, the search ranker server 116 is under control and/or management of a search engine, such as that provided by YANDEX™ search engine of Yandex LLC of Lev Tolstoy Street, No. 16, Moscow, 119021, Russia. However, the search ranker server 116 can be implemented differently (such as a local searcher and the like). The search ranker server 116 is configured to maintain a search database 118, which contains an indication of various resources available and accessible via the communication network 102.

The process of populating and maintaining the search database 118 is generally known as "crawling" where a crawler application 120 executed by the search ranker server 116 is configured to "visit" various web sites and web pages accessible via the communication network 102 and to index the content thereof (such as associate a given web resource to one or more key words). In some embodiments of the present technology, the crawler application 120 maintains the search database 118 as an "inverted index". Hence, the crawler application 120 of the search ranker server 116 is configured to store information about such indexed web resources in the search database 118.

When the search ranker server 116 receives a search query from an assessor (such as for examples, "how to have an early retirement"), the search ranker server 116 is configured to execute a ranking application 122. The ranking application 122 is configured to access the search database 118 to retrieve an indication of a plurality of resources that are potentially relevant to the submitted search query. In this example, the ranking application 122 is further configured to rank the so-retrieved potentially relevant resources so that they can be presented in a ranked order on a Search Engine Results Page (SERP), such that the SERP presents so-ranked more relevant resources at a top of the list.

To that end, the ranking application 122 is configured to execute a ranking algorithm. In some embodiments of the present technology, the ranking algorithm is a machine learning algorithm (MLA). In various embodiments of the present technology, the ranking algorithm is based on neural networks, decision tree models, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like.

In some embodiments of the present technology, the ranking application 122 employs a supervised-learning based MLA. In other embodiments, the ranking application 122 employs a semi-supervised-learning based MLA.

Within these embodiments, the ranking application 122 can be said to be used in two phases—a training phase where the ranking application 122 is "trained" to derive a MLA formula and an in-use phase where the ranking application 122 is used to rank documents using the MLA formula.

In some embodiments of the present technology, the training server 114 is under control and/or management of a crowdsource platform such as YANDEXTOLOKA™ platform provided by YANDEX™. However any commercial or proprietary crowd-sourcing platform can be used. However, it should be expressly understood that even though embodiments of the present technology will be described using crowdsourced document labelling as an example, the teachings presented herein can be applied to professional-assessor based document labelling, etc.

In some embodiments of the present technology, the plurality of electronic devices 104 can be part of a pool of professional assessors and as such, the assessors (the first assessor 110, the second assessor 112) can all be professional assessors. Alternatively, the plurality of electronic devices 104 can be part of a pool of crowd-sourcing assessors and as such, the assessors (the first assessor 110 and the second assessor 112) can all be crowd-sourcing participants.

In yet additional embodiments, the plurality of electronic devices 104 can be part split—some of the plurality of electronic devices 104 can be part of the professional assessors and some of the plurality of electronic devices 104 can be part of a pool of crowd-sourcing assessors. As such, the first assessor 110 can be a professional assessor; while the second assessor 112 can be a crowd-sourcing participant.

The training server 114 comprises a crowdsourcing database 124. The crowdsourcing database 124 is configured to obtain and store a digital training document 126 to be assessed by the plurality of electronic devices 104. In the context of the present technology, the terms "digital training document" refer to a task provided to one or more assessors for obtaining needed services, ideas, or content with the use of labels. As such, the digital training document 126 comprises a range of possible labels 128 from which the assessors are to select a particular label. The manner in which the crowdsourcing database 124 obtains the digital training document 126 is not limited, and may for example be, transmitted by an administrator (not depicted) associated with the crowdsource platform.

Although in the depicted embodiment, the crowdsourcing database 124 comprises only one digital training document 126, it should be noted that the exact number of the digital training document 126 is not particularly limited, and generally speaking, it can be said that the crowdsourcing database 124 comprises at least one digital training document 126, and the range of possible labels 128 comprises at least 2 possible labels (described below).

The training server 114 also comprises an assessor history database 130. The assessor history database 130 is configured to store some or all data indicative of previous labelling/assessing history for each of the assessors associated with the plurality of electronic devices 104. In some embodiments of the present technology, the training server 114 is configured to analyze the data contained in the assessor history database 130 to generate and store a set of assessor-specific tendency parameter 132 in the assessor history database 130.

In the context of the present technology, the terms "assessor-specific tendency parameter" represents the label-assigning characteristics of each of the assessors associated with the plurality of electronic devices 104 (i.e. the first assessor 110 and the second assessor 112).

For example, based on the previous labelling activities, the training server 114 may determine that the first assessor 110 to be an extreme assessor (based on the fact that the first assessor 110 has a tendency to only select a polarized label from the range of possible labels 128).

As such, in a situation where the first assessor 110 is asked to select a particular label from the range of possible labels 128 (say 1 to 5, 5 being the most relevant) of a digital training document 126 to a given query, the first assessor 110 has a tendency of assigning either 1 or 5, but scarcely assigns the intermediate values.

Alternatively, the training server 114 may determine that the second assessor 112 to be an indecisive assessor (based on the fact that the second assessor 112 has a tendency to select intermediate label from the range of possible labels 128).

For example, in a situation where the second assessor 112 is asked to select a particular label from the range of possible labels 128 (say 1 to 5, 5 being the most relevant) of a digital training document 126 to a given query, the second assessor 112 will scarcely assign 1 or 5, but will tend to assign intermediate values (such as 2, 3, and 4).

Based at least on the generated set of assessor-specific tendency parameters 132 and the range of possible labels 128, the training server 114 is further configured to generate an assessor-inherent probability score 134 for each label of the range of possible labels 128. The terms "assessor-inherent probability score" refers to the probability of a given label from the range of possible labels 128 being selected by the assessor associated with the assessor-specific tendency parameter 132 (explained below).

Figure 2:
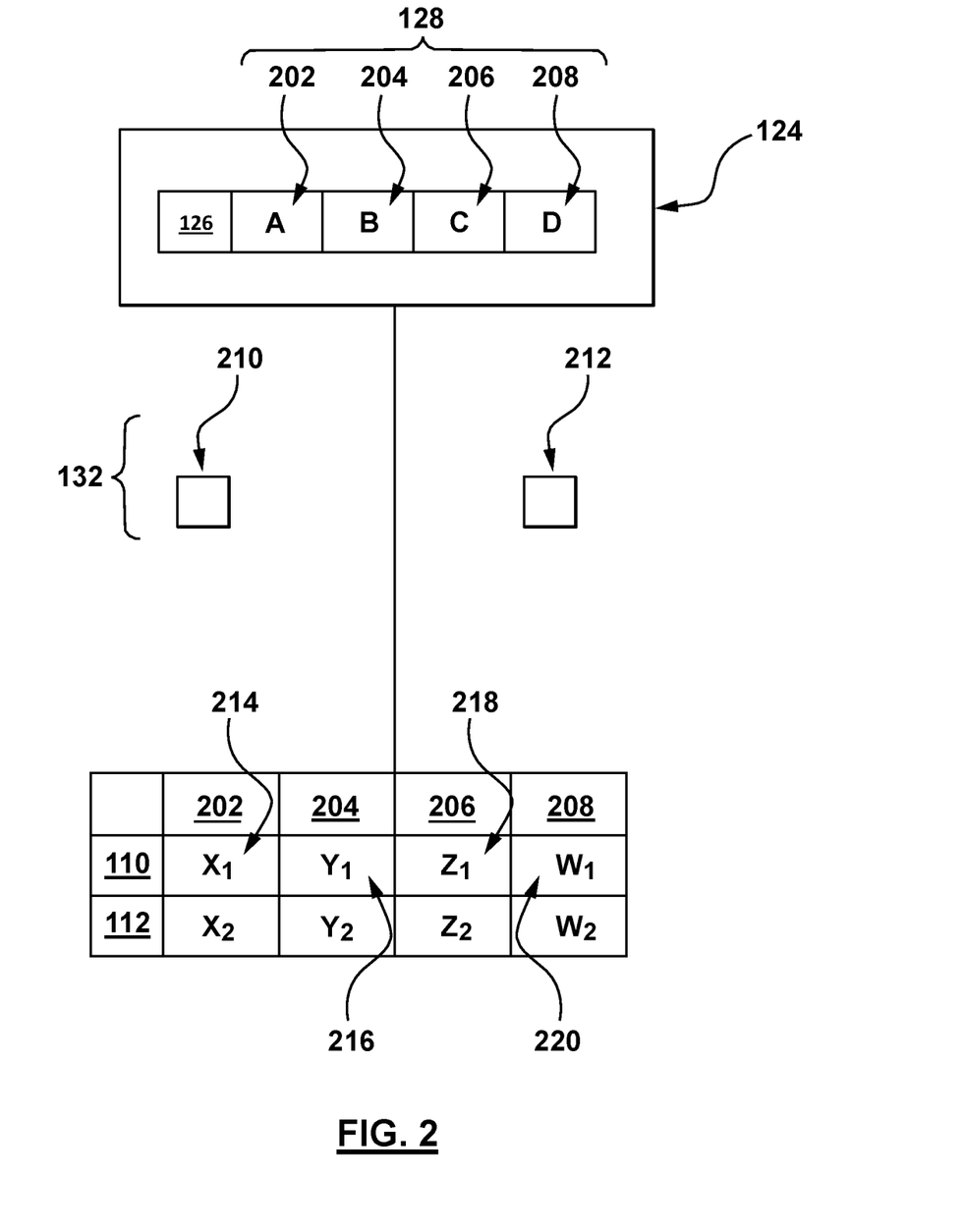
FIG. 2 depicts a schematic representation of generating an assessor-inherent probability score.

With reference to FIG. 2, the manner of generating the assessor-inherent probability score 134 is schematically depicted. As stated previously the crowdsourcing database 124 comprises the digital training document 126 and the range of possible labels 128. In the given illustration, the range of possible labels 128 comprises four possible labels, namely, a first possible label 202, a second possible label 204, a third possible label 206 and a fourth possible label 208.

In the depicted illustration, the set of assessor-specific tendency parameter 132 comprises a first assessor tendency parameter 210 and a second assessor tendency parameter 212. The first assessor tendency parameter 210 is associated with the first assessor 110. The second assessor tendency parameter 212 is associated with the second assessor 112.

Based on the range of possible labels 128 and the first assessor tendency parameter 210, the training server 114 is configured to calculate the assessor-inherent probability score 134 for the possible labels (the first possible label 202, the second possible label 204, the third possible label 206, and the fourth possible label 208) for the first assessor 110. It is noted that the assessor-inherent probability score 134 is determined independent from the actual label selected by the given assessor (such as the first assessor 110 in this example).

In the given example, based at least on the first assessor tendency parameter 210, the range of possible labels 128, and the digital training document 126, the training server 114 has calculated the assessor-inherent probability score 134 for the first assessor 110 to be as follow: the first label inherent probability score 214 is a percentage $X_1$, the second label inherent probability score 216 is a percentage $Y_1$, the third label inherent probability score 218 is a percentage $Z_1$ and the fourth label inherent probability sore 220 is a percentage $W_1$.

The manner in which the label assessor-inherent probability score 134 for the first assessor 110 (the first label inherent probability score 214, the second label inherent probability score 216, the third label inherent probability score 218, and the fourth label inherent probability score 220) is determined is not limited, and may be determined using any probabilistic model.

The training server 114 is also configured to calculate the label assessor-inherent probability score 134 of the second assessor 112 in a similar manner (the label assessor-inherent probability score 134 of the second assessor 112 is not numbered).

Returning now to the description of FIG. 1, the training server 114 is configured to transmit the digital training document 126 with the range of possible labels 128 to each of the plurality of electronic devices 104, via the communication network 102, along with a given instruction, to then obtain and store the selected labels by each assessor (each of the first assessor 110, and the second assessor 112), into a crowdsourced database 136.

Depending on specific implementations, the assessors (such as the first assessor 110 and the second assessor 112) are provided with labelling instructions, such as but not limited to:

Using the range of possible labels 128, classify the digital training document 126 (ex. an image) into a Duchenne smile and a non-Duchenne smile;

Using the range of possible labels 128, rate the relevancy of the digital training document 126 (ex. a query-URL pair) using a scale of "1" to "5";

Using the range of possible labels 128, classify the digital training document (ex. a webpage) into four categories depending on the presence of adult content.

In the provided illustration, the first assessor 110 has selected, upon assessing the digital training document 126 and the range of possible labels 128, a first selected label 138. For example, if the first assessor 110 has selected the second possible label 204, the first selected label 138 is the second possible label 204 (i.e. the value of the first selected label 138 corresponds to the value of the second possible label 204). The second assessor 112, on the other hand, has selected a second selected label 140. For example, if the second assessor 112 has selected the first possible label 202, the second selected label 140 is the first possible label 202 (i.e. the value of the second selected label 140 corresponds to the value of the first possible label 202).

The training server 114 further comprises a processing application 142. The processing application 142 is configured to generate a training object 144, used for training the ranking application 122. In some embodiments of the present technology the training object 144 comprises the digital training document 126 and an assigned label 146. In some embodiments, the assigned label 146 is a consensus label distribution. In accordance with embodiments of the present technology the consensus label distribution represents a range of perceived labels by the assessors associated with the plurality of electronic devices 104 (the first assessor 110, and the second assessor 112) with an associated probability score for each of the perceived labels.

In the context of the present specification, the terms "perceived label" refer to a given label from the range of possible labels 128 that is perceived by a given assessor as being the most relevant to the task associated with the digital training document 126.

For example, the first assessor 110, when choosing the first selected label 138, had also assessed the relevancy of each of the possible labels (the first possible label 202, the second possible label 204, the third possible label 206 and the fourth possible label 208). In other words, the first assessor 110 had perceived the relevancy of each possible label (the first possible label 202, the second possible label 204, the third possible label 206 and the fourth possible label 208) and selected the first selected label 138. However, in some situations, the label that is perceived to be most relevant by the assessor is not necessarily the same as the selected label by the assessor. For example, the first assessor 110 might have perceived the first possible label 202 as being the most relevant but have selected the second possible label 204. This "noisiness" can be due to several factors, such as a simple human error of selecting the wrong label, uncertainty of the assessor, inherent assessor bias, ambiguity of the labeling task, or other non-exhaustive factors.

Figure 3:
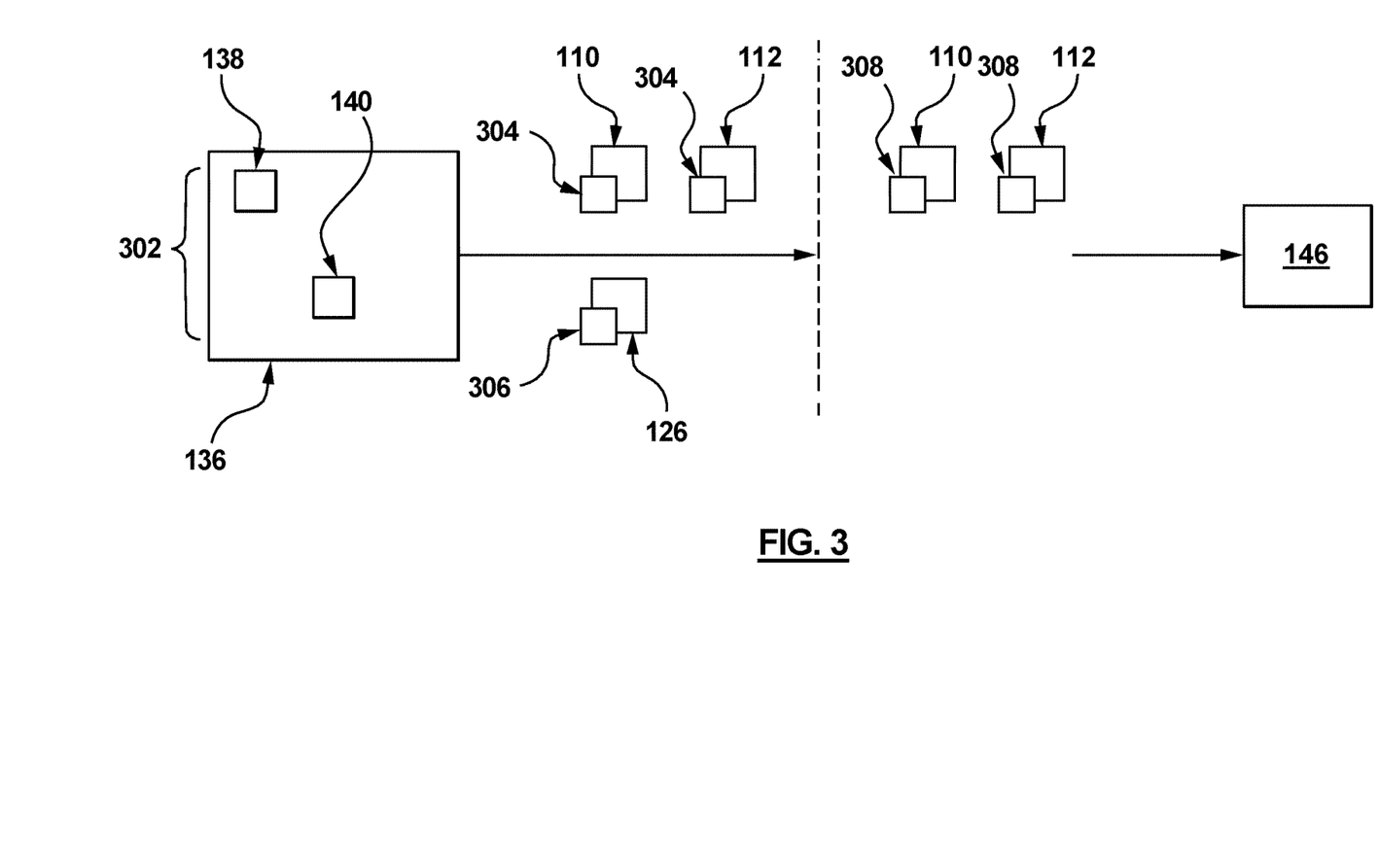
FIG. 3 depicts schematic representation of generating an assigned label.

With regards to FIG. 3, the manner of generating the assigned label 146 is schematically depicted. Upon receiving the selected labels (the first selected label 138, the second selected label 140) from the plurality of electronic devices 104, the selected labels are stored in the crowdsourced database 136. In the depicted illustration, the crowdsourced database 136 comprises a pool of selected labels 302. The pool of selected labels 302 comprises the first selected label 138 that was selected by the first assessor 110, and the second selected label 140 selected by the second assessor 112. Needless to say, although the pool of selected labels 302 is depicted as comprising only two labels—i.e. the first selected label 138 and the second selected label 140, it is not limited as such, and may contain more selected labels.

Based on the pool of selected labels 302, the processing application 142 is configured to determine an expertise parameter 304 for each assessor (the first assessor 110 and the second assessor 112). The manner in which the expertise parameter 304 is determined is not limited, and may, for example, be determined using a minimax entropy principle or other means. The expertise parameter 304 is an objective assessor expertise, and is independent of any digital training document 126. In other words, the value of the expertise parameter 304 of each assessor does not vary based on the digital training document 126.

The processing application 142 is further configured to calculate a difficulty parameter 306 of the digital training document 126 based on the pool of selected labels 302. The manner in which the difficulty parameter 306 is determined is not limited, and may, for example, be determined using the minimax entropy principle or other means. The difficulty parameter 306 is independent of the assessors (the first assessor 110 and the second assessor 112) performing the provided task. In other words, the value of the difficulty parameter 306 does not vary according to the assessors performing the task.

In some embodiments of the present technology, based on the expertise parameter 304 and the difficulty parameter 306, the processing application 142 is configured to determine an assessor-specific perceived label distribution 308 for each assessor (the first assessor 110 and the second assessor 112).

In the context of the present specification, the terms "assessor specific perceived label distribution" refer to the distribution of perceived labels for a given assessor (the first assessor 110 and the second assessor 112) and its associated probability score.

The assessor-specific perceived label distribution 308 for a given assessor is a sum of all the assessor-inherent probability scores 134 of a given perceived label (which can be one of the first possible label 202, the second possible label 204, the third possible label 206, or the fourth possible label 208) multiplied by a conditional probability 310 score associated with the given perceived label. In the context of the present specification, the terms "conditional probability score" represents a probability of the selected label by the given assessor, provided that the given assessor perceived the given label of the range of possible labels 128 as the most relevant label to the digital training document 126. The conditional probability score is calculated for the selected label based on a series of "conditions", each condition being that the given assessor perceived a given one of the range of possible labels 128 as the most suitable one.

Figure 4:
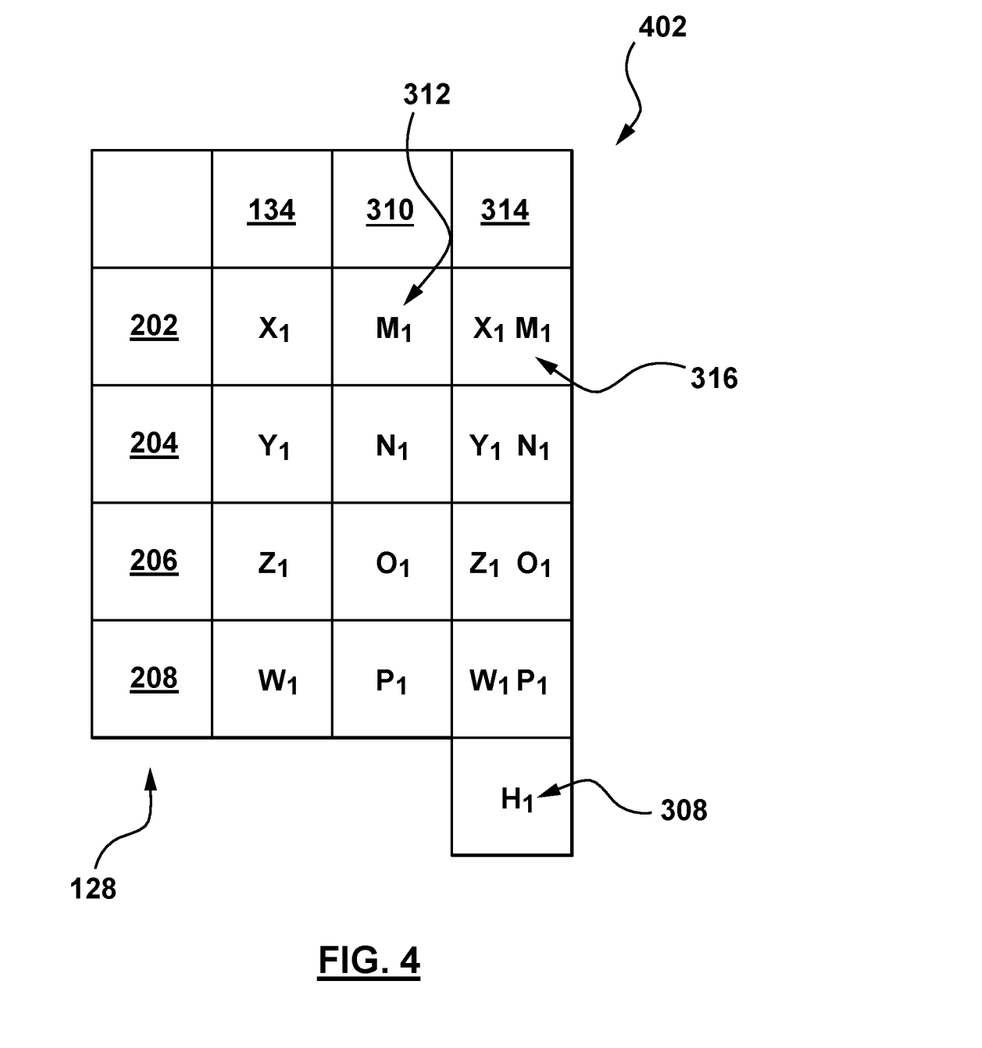
FIG. 4 depicts a schematic representation of generating an assessor-specific perceived label distribution.

Referring to FIG. 4, the manner of generating the assessor-specific perceived label distribution 308 is schematically depicted. A table 402 provides an illustration of various data for determining assessor-specific perceived label distribution 308 for the first assessor 110.

The first column of the table 402 corresponds to the range of possible labels 128 for the digital training document 126, namely, the first possible label 202, the second possible label 204, the third possible label 206, and the fourth possible label 208. The second column of the table 402 corresponds to the assessor-inherent probability score 134. As such, the probability $X_1$ is the first label inherent probability score 214 of the first possible label 202, the probability $Y_1$ is the second label inherent probability score 216 of the second possible label 204, the probability $Z_1$ is the third label inherent probability score 218 of the third possible label 206, and the probability $W_1$ is the fourth label inherent probability score 220 of the fourth possible label 208.

The third column of the table 402 corresponds to the conditional probability score 310. Provided that the first assessor 110 has selected the second possible label 204, the value $M_1$, which is a first label conditional probability score 312, will represent the probability that the first assessor 110 has perceived the first possible label 202 as being the most relevant (despite the fact that the first assessor 110 has selected the second possible label 204). In other words, assuming that the first assessor 110 meant to choose the first possible label 202, what is the conditional probability of the second possible label 204 (i.e. that the first assessor 110 has selected advertently or inadvertently the second possible label 204 although the first assessor 110 perceived the first possible label 202 as the most suitable one). In some embodiments of the present technology, the expertise parameter 304 and the difficulty parameter 306 are used as weight factors when calculating the conditional probability score 310. The process of identifying the conditional probability score 310 for each of the other possible labels is done in a similar manner.

The fourth column of the table 402 corresponds to a label-specific perceived score 314. The label-specific perceived score 314 represents a probability of the given label to have been perceived as relevant by the first assessor 110. In the given illustration, a first-label-specific perceived score 316 having of value $X_1 M_1$ is determined by multiplying the first label inherent probability score 214 and the first label conditional probability score 312. The process of identifying the label-specific perceived score 314 for each of the other possible labels is done in a similar manner.

The table 402 also contains the sum of all the label specific perceived score 314 which represents the assessor-specific perceived label distribution 308.

Although FIG. 4 only illustrates an embodiment of determining the assessor-specific perceived label distribution 308 of the first assessor 110, the assessor-specific perceived label distribution 308 of the second assessor 112 is determined in a similar manner.

Returning now to FIG. 3, the assigned label 146 in the form of the consensus label distribution is generated by aggregating the assessor-specific perceived label distribution 308 of the first assessor 110 and the assessor-specific perceived label distribution 308 of the second assessor 112 (as well as assessor-specific perceived label distributions 308 of other assessors potentially present within the system 100).

Generally speaking, the consensus label distribution can be said to be derived by maximizing the likelihood $(L(\{y_j^w\}))$ of the noisiness of the selected labels $\{y_j^w\}$, that is represented by the following pseudo-formula:

$$L(\{y_j^w\}) = \Pi_{w \in W_j} \Sigma_{z_j^w \in \gamma} \Pr(z_j^w) \Pr(y_j^w | Z_j = z_j^w) \quad \text{Formula 1}$$

Where:
w represents a given assessor (i.e. the first assessor 110, or the second assessor 112);
W represents the plurality of assessors associated with the plurality of electronic devices 104;
j represents the digital training document 126;
$y_j^w$ represents the label selected (i.e. the first selected label 138, or the second selected label 140) by a given assessor w (i.e. the first assessor 110 or the second assessor 112) for the digital training document j (i.e. the digital training document 126);
$z_j^w$ represents a given assessor's (i.e. the first assessor 110, or the second assessor 112) perceived label when assessing the digital training document 126;
$Z_j$ represents a random variable which represents the possible outcomes of $z_j^w$.
γ represents the range of possible labels 128;
$\Pr(z_j^w)$ represents the assessor-inherent probability score 134 of a given label;
$\Pr(y_j^w | Zj = z_j^w)$ represents the conditional probability score 310, which is determined using the expertise parameter 304 of a given assessor (represented as $e^w$) and the difficulty parameter 306 of the digital training document 126 (represented as $d_j$).

The present technology contemplates the use of modified traditional models to implement the above described likelihood of noisiness formula, such as (i) the Dawid and Skene model, (ii) the generative model of labels, abilities and difficulties (GLAD), and (iii) the minimax entropy (MME) principle, to calculate the consensus label distribution.

As stated previously, the traditional models are based on the premise that each digital training document 126 is assumed to have a single true label. Thus, the traditional models of determining the consensus label (as a single label) is done by maximizing the joint likelihood of the selected labels and a latent (i.e. unknown) true label, which is represented by the following formula:

$$\mathbb{E}_{L(\{y_j^w\}, z_j)} = \Pi_{z_j \in \gamma} \Pr(z_j) \Sigma_{w \in W_j} \Pr(y_j^w | Z_j = z_j) \quad \text{Formula 2}$$

Where $z_j$ represents the latent true label.

Dawid and Skene Model

Under the Dawid and Skene model a vector of prior probabilities of a possible label being the true label (a parameter p) is defined as follow: $p := (p_1, \ldots, p_K)$ (where $\gamma := \{1, \ldots, K\}$). The expertise parameter $e^w$ is a confusion matrix of size K×K. The confidence of a selected label being the true label is determined with the following formula: $\Pr(Y_j^w = y_j^w | Z_j = z_j) := e^w(z_j, y_j^w)$.

In accordance with embodiments of the present technology, the Dawid and Skene model is modified as follow: (i) for each digital training document 126, a vector $q_j = (q_{j,1}, \ldots, q_{j,K})$ is drawn from a Dirichlet distribution $P_Q := \text{Dir}(p)$, this vector $q_j$ is the parameter of the multinomial distribution of perceived labels for the digital training document 126; (2) when the first assessor 110 (as an example) observes the digital training document 126, first, a perceived label is drawn from the multinomial distribution $\text{Mult}(q_j)$, and then the selected label (such as the first selected label 138) is drawn from the multinomial distribution $\Pr(Y_j^w | Z_j = z_j^w)$ which is equal by definition to $\text{Mult}(e^w(z_j^w, \bullet))$ where $e^w(k, \bullet)$ stands for the k-th row of the confusion matrix of the expertise parameter 304.

GLAD Model

Under the GLAD model, a vector of prior probabilities of a possible label being the true label (a parameter p) is also defined as follow: $p := (p_1, \ldots, p_K)$. The conditional probability $Pr(Y_j^w | Zj = z_j^w)$ is equal by definition to $P_{GLAD} Pr(Y_j^w | Zj = z_j)$ where $Y_j^w$ is a random variable whose value is the observed noisy label assigned by a given assessor w to the digital training document j. $Y_j^w$ is determined based on the value $z_j$ with probability $$a(w, j) := \frac{1}{1 + \exp(-e^w d_j)},$$

or, with probability $1-a(w,j)$, and it is taking a value from the set $\{1, \ldots, K\} \setminus \{z_j\}$.

In accordance with embodiments of the present technology, the GLAD model is modified as follow: (1) for the digital training document 126, the vector $q_j$ is sampled from a Dirichlet distribution $P_Q := Dir(p)$; and (2) a perceived label is sampled from the multinomial distribution $Mult(q_j)$, and then, the selected label $y_j^w$ (such as the first selected label 138) is generated from $Pr(Y_j^w | = z_j^w)$ which is equal by definition to $P_{GLAD} Pr(Y_j^w | = z_j^w)$.

MME Principle

Under the MME principle, the expertise parameter $e^w$ is a matrix of size K×K and the difficulty parameter $d_j$ is also a matrix of size K×K. Using these parameters, for each worker w and each digital training document j, the conditional probability $Pr(Y_j^w | = z_j^w)$ (see Formula 2) is equal by definition to $P_{MME}(Y_j^w | = z_j^w)$, which have the probability $Pr(Y_j^w = y | Z_j = z) \alpha \exp(e^w(z, y) + d_j(z, y))$.

In accordance with embodiments of the present technology, the MME principle is modified as follow: (1) for each digital training document 126, the vector $q_j$ is generated from the Dirichlet distribution $P_Q := Dir(p)$; (2) for a given assessor (such as the first assessor 110) and the digital training document 126, a perceived label is sampled from the multinomial distribution $Mult(q_j)$, and then, the selected label (such as the first selected label 138) is generated from $(Y_j^w | Z_j = z_j^w)$ which is equal to $P_{MME}(Y_j^w | Z_j = z_j^w)$.

Embodiments of the present technology are based on developers' appreciation that the use of the training object 144 in the form of the training digital document 126 and the consensus label distribution as an assigned "label" for the training of the ranking application 122 improves the accuracy of the ranking application 122. Without wishing to be bound to any specific theory, embodiments of the present technology are based on the premise that the more information regarding the selected labels (the first selected label 138, and second selected label 140) and information on the assessors (the first assessor 110, second assessor 112) for training of the ranking application 122, the ranking application 122 will yield better results in application.

For example, if a set of assessors are tasked with "identify the following color" to obtain a dataset to train the ranking application 122, the conventional manner of generating the consensus label was by majority voting (ex. "red" because 51% voted "red"). However, in the embodiments of the present technology, a range of subjective but true labels would be fed to the ranking application 122 for training ("51% have perceived it as red, 29% as Fuchsia, and 20% as pink"). Thus unlike the prior art where the training object is associated with a confidence in each label, the provided technology's training object is an estimated probability of the perceived labels by the assessors (the first assessor 110, the second assessor 112).

Figure 5:
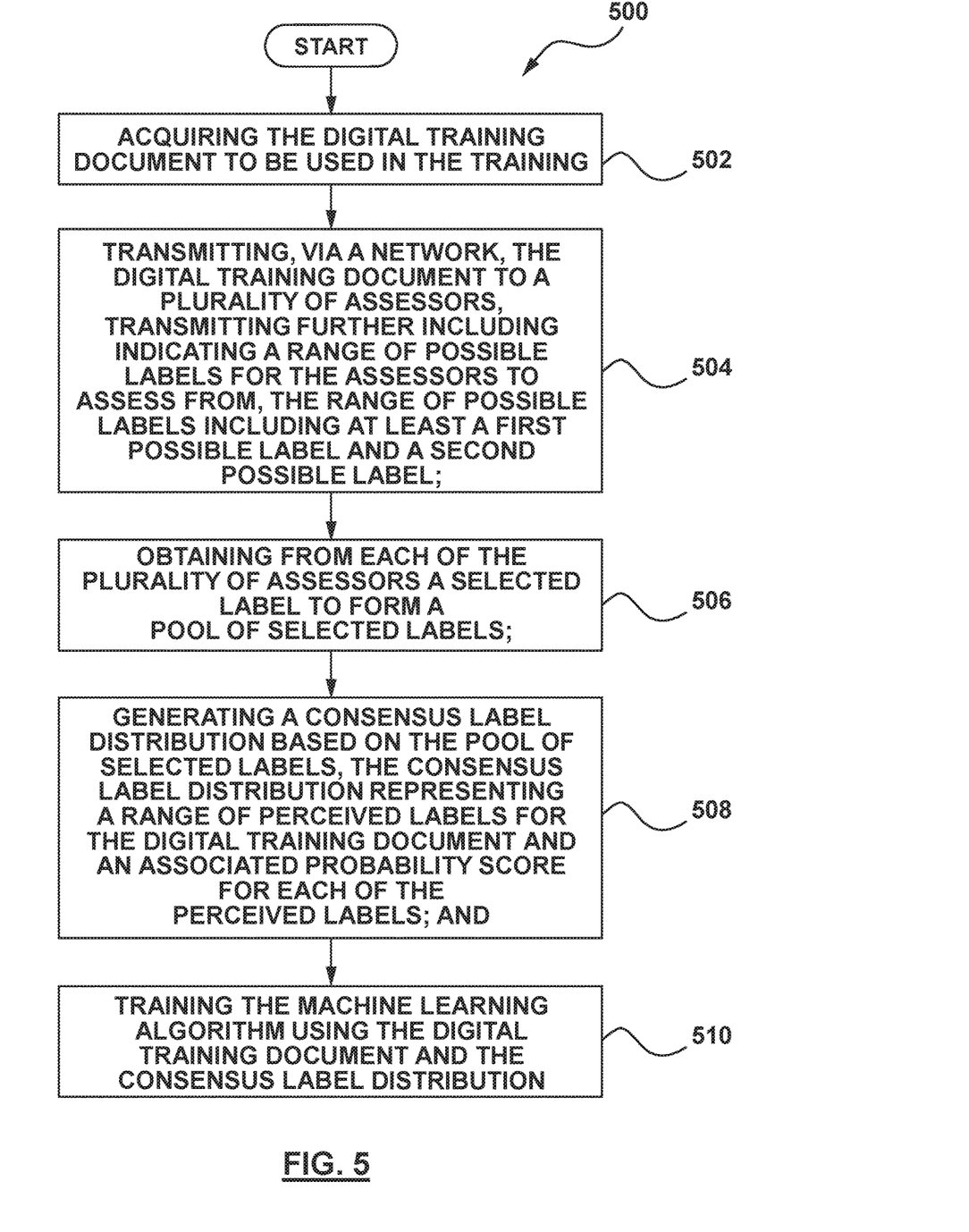
FIG. 5 depicts a flow chart of a method of generating a training object, the method being executable by the training server of FIG. 1, the method being executed in accordance with non-limiting embodiments of the present technology.

Given the architecture and examples provided herein above, it is possible to execute a computer-implemented method of generating a training object for training a machine learning algorithm (such as the ranking application 122). With reference to FIG. 5, there is depicted a flow chart of a method 500, the method 500 being executable in accordance with non-limiting embodiments of the present technology. The method 500 can be executed by the training server 114.

Step 502—acquiring the digital training document to be used in the training

The method 500 starts at step 502, where the training server 114 acquires the digital training document 126.

In some embodiments of the present technology, the digital training document 126 is a webpage. In alternative embodiments of the present technology, the digital training document 126 is an image, a text, or a media.

Step 504—transmitting, via a network, the digital training document to a plurality of assessors, transmitting further including a range of possible labels for the assessors to assess from, the range of possible labels including at least a first possible label and a second possible label At step 504, the training server 114 transmits, via the communication network 102, the digital training document 126 and the range of possible labels 128 to the plurality of electronic devices 104 for assessment.

In some embodiments of the present technology, a labelling instruction is transmitted to the plurality of electronic devices 104 along with the digital training document 126 and the range of possible labels 128.

In certain embodiments, the labelling instruction is at least one of a categorization task or a rating task.

Step 506—obtaining from each of the plurality of assessors a selected label to form a pool of selected labels At step 506, the training server 114 obtains from each of the assessor using their respective one of the plurality of electronic devices 104 (the first assessor 110, the second assessor 112) the selected labels (the first selected label 138 and the second selected label 140) to form the pool of selected labels 302.

Step 508—generating a consensus label distribution based on the pool of selected labels, the consensus label distribution representing a range of perceived labels for the digital training document and an associated probability score for each of the perceived labels; and At step 508, based on the pool of selected labels 302, the training server 114 generates the assigned label 146 in the form of a consensus label distribution.

Step 510—training the machine learning algorithm using the digital training document and the consensus label distribution.

At step 510 the training server 114 transmits the digital training document 126 and the assigned label 146 in the form of a consensus label distribution to the ranking application 122 of the search ranker server 116.

In some embodiments, the ranking application 122 is configured to execute a machine learning algorithm and wherein training the ranking application 122 comprises training the machine learning algorithm.

The ranking application 122 is configured to use the digital training document 126 and the assigned label 146 to train the machine learning algorithm.

In certain embodiments of the method 400, the training is based on a target of improving the relevancy of a search result in response to a search request by the search ranker server 116.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

Needless to say, although the present technology has been described using two assessors (the first assessor 110 and the second assessor 112) assessing a single digital training document 126, this was merely done so for ease of understanding and is not intended to be limitative. It would be obvious for a person skilled in the art that in order to properly train and optimize the ranking application 122, a larger number of assessors and digital training documents will be required.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

The invention claimed is:

1. A computer implemented method of generating a training object for training a machine learning algorithm, the training object including a digital training document and an assigned label, the method executable at a training server, the method comprising:
   acquiring the digital training document to be used in the training;
   transmitting, via a communication network, the digital training document to a plurality of assessors, transmitting further including indicating a range of possible labels for the assessors to assess from the range of possible labels including at least a first possible label and a second possible label;
   obtaining from each of the plurality of assessors a selected label to form a pool of selected labels;
   generating a consensus label distribution based on the pool of selected labels, the consensus label distribution representing a range of perceived labels for the digital training document and an associated probability score for each of the perceived labels;
   the consensus label distribution being generated by aggregating an assessor-specific perceived label distribution for each assessor of the plurality of assessors, wherein:
      the assessor-specific perceived label distribution for a given assessor of the plurality of assessors, is determined by:
         determining, for each of the range of possible labels, an assessor-inherent probability score, the assessor-inherent probability score for a given one of the range of possible labels being indicative of the probability of the given one of the range of possible labels being selected by the given assessor;
         determining, for each of the range of possible labels, a conditional probability score, the conditional probability score for a given one of the range of possible labels being indicative of the probability of the given one of the range of possible labels being perceived as a most relevant label to the digital training document by the given assessor despite the given assessor having selected a different one of the range of possible labels; and
         obtaining the assessor-specific perceived label distribution by aggregating, for each of the range of possible labels, the assessor-inherent probability score and the conditional probability score for the given assessor;
   training the machine learning algorithm using the digital training document and the consensus label distribution.

2. The method of claim 1, the method further comprising:
   determining an expertise parameter for each of the plurality of assessors based on the pool of selected labels; and
   determining a difficulty parameter of the digital training document based on the pool of selected labels.

3. The method of claim 2, wherein:
   the expertise parameter is independent of the digital training document assessed; and
   the difficulty parameter is independent of any assessor assessing the digital training document.

4. The method of claim 1, wherein
   the conditional probability score is determined, for each of the range of possible labels, based at least on the expertise parameter and the difficulty parameter.

5. The method of claim 1, wherein the assessor-inherent probability score is determined based at least on a given assessor's assessor-specific tendency parameter.

6. The method of claim 5, further comprising determining the given assessor's assessor-specific tendency parameter based at least on the given assessor's assessing history.

7. The method of claim 1, wherein the machine learning algorithm is executed by a ranking application of a search ranker server, and wherein the training is based on a target of improving the accuracy of the machine learning algorithm.

8. The method of claim 7, wherein improving the accuracy represents improving a relevancy of a search result in response to a search request.

9. A training server for training a ranking application, the ranking application for ranking search results, the training server comprising:
   a network interface for communicatively coupling to a communication network;
   a processor coupled to the network interface, the processor configured to:
      acquire the digital training document to be used in the training;
      transmit, via the communication network, the digital training document to a plurality of assessors, transmitting further including indicating a range of possible labels for the assessors to assess from the range of possible labels including at least a first possible label and a second possible label;

obtain from each of the plurality of assessors a selected label to form a pool of selected labels;

generate a consensus label distribution based on the pool of selected labels, the consensus label distribution representing a range of perceived labels for the digital training document and an associated probability score for each of the perceived labels;

the consensus label distribution being generated by aggregating an assessor-specific perceived label distribution for each assessor of the plurality of assessors, wherein:

the assessor-specific perceived label distribution for a given assessor of the plurality of assessors, is determined by:

determining, for each of the range of possible labels, an assessor-inherent probability score, the assessor-inherent probability score for a given one of the range of possible labels being indicative of the probability of the given one of the range of possible labels being selected by the given assessor;

determining, for each of the range of possible labels, a conditional probability score, the conditional probability score for a given one of the range of possible labels being indicative of the probability of the given one of the range of possible labels being perceived as a most relevant label to the digital training document by the given assessor despite the given assessor having selected a different one of the range of possible labels; and obtaining the assessor-specific perceived label distribution by aggregating, for each of the range of possible labels, the assessor-inherent probability score and the conditional probability score for the given assessor;

train the machine learning algorithm using the digital training document and the consensus label distribution.

10. The training server of claim 9, the processor further configured to:

determine an expertise parameter for each of the plurality of assessors based on the pool of selected labels; and determine a difficulty parameter or the digital training document based on the pool of selected labels.

11. The training server of claim 10, wherein:

the expertise parameter is independent of the digital training document assessed; and the difficulty parameter is independent of any assessor assessing the digital training document.

12. The training server of claim 9, wherein the conditional probability score is determined, for each of the range of possible labels, based at least on the expertise parameter and the difficulty parameter.

13. The training server of claim 9, wherein the assessor-inherent probability score is determined based at least on a given assessor's assessor-specific tendency parameter.

14. The training server of claim 13, further comprising determining wherein the given assessor's assessor-specific tendency parameter based at least on the given assessor's assessing history.

15. The training server of claim 9, wherein the machine learning algorithm is executed by a ranking application of a search ranker server, and wherein the training is based on a target of improving the accuracy of the machine learning algorithm.

16. The training server of claim 15, wherein improving the accuracy represents improving a relevancy of a search result in response to a search request.

17. A computer implemented method of generating a training object for training a machine learning algorithm, the training object including a digital training document and an assigned label, the method executable at a training server, the method comprising:

acquiring the digital training document to be used in the training;

transmitting, via a communication network, the digital training document to a plurality of assessors, transmitting further including indicating a range of possible labels for the assessors to assess from the range of possible labels including at least a first possible label and a second possible label;

obtaining from each of the plurality of assessors a selected label to form a pool of selected labels;

determining an expertise parameter for each of the plurality of assessors based on the pool of selected labels, wherein:

the expertise parameter is independent of the digital training document assessed;

determining a difficulty parameter of the digital training document based on the pool of selected labels, wherein:

the difficulty parameter is independent of any assessor assessing the digital training document;

generating a consensus label distribution based on the pool of selected labels, the consensus label distribution representing a range of perceived labels for the digital training document and an associated probability score for each of the perceived labels, wherein the consensus label distribution is determined by:

determining an assessor-specific perceived label distribution for each assessor of the plurality of assessors;

aggregating each of the assessor-specific perceived label distribution of the plurality of assessors, wherein the assessor-specific perceived label distribution for a given assessor is determined by:

for the first possible label:

determining an assessor-inherent probability score of the first possible label being selected by the given assessor;

determining a conditional probability score based at least on the expertise parameter and the difficulty parameter, the conditional probability score representing the probability of the selected label provided the given assessor perceived the first possible label as a most relevant label to the digital training document; and aggregating the assessor-inherent probability score and the conditional probability score to obtain a first label specific perceived score;

for the second possible label:

determining the assessor-inherent probability score of the second possible label being selected by the given assessor;

determining the conditional probability score based at least on the expertise parameter and the difficulty parameter, the conditional probability score representing the probability of the selected label provided the given assessor perceived the second possible label as the most relevant label to the digital training document;

aggregating the assessor-inherent probability score and the conditional probability score to obtain a second label specific perceived score;
aggregating the first label specific perceived score and the second label specific perceived score;
training the machine learning algorithm using the digital training document and the consensus label distribution.

* * * * *